March 22, 1932. N. J. VILE 1,850,249
DRIVING DEVICE FOR SPEED INDICATORS
Filed Aug. 22, 1930    2 Sheets-Sheet 1
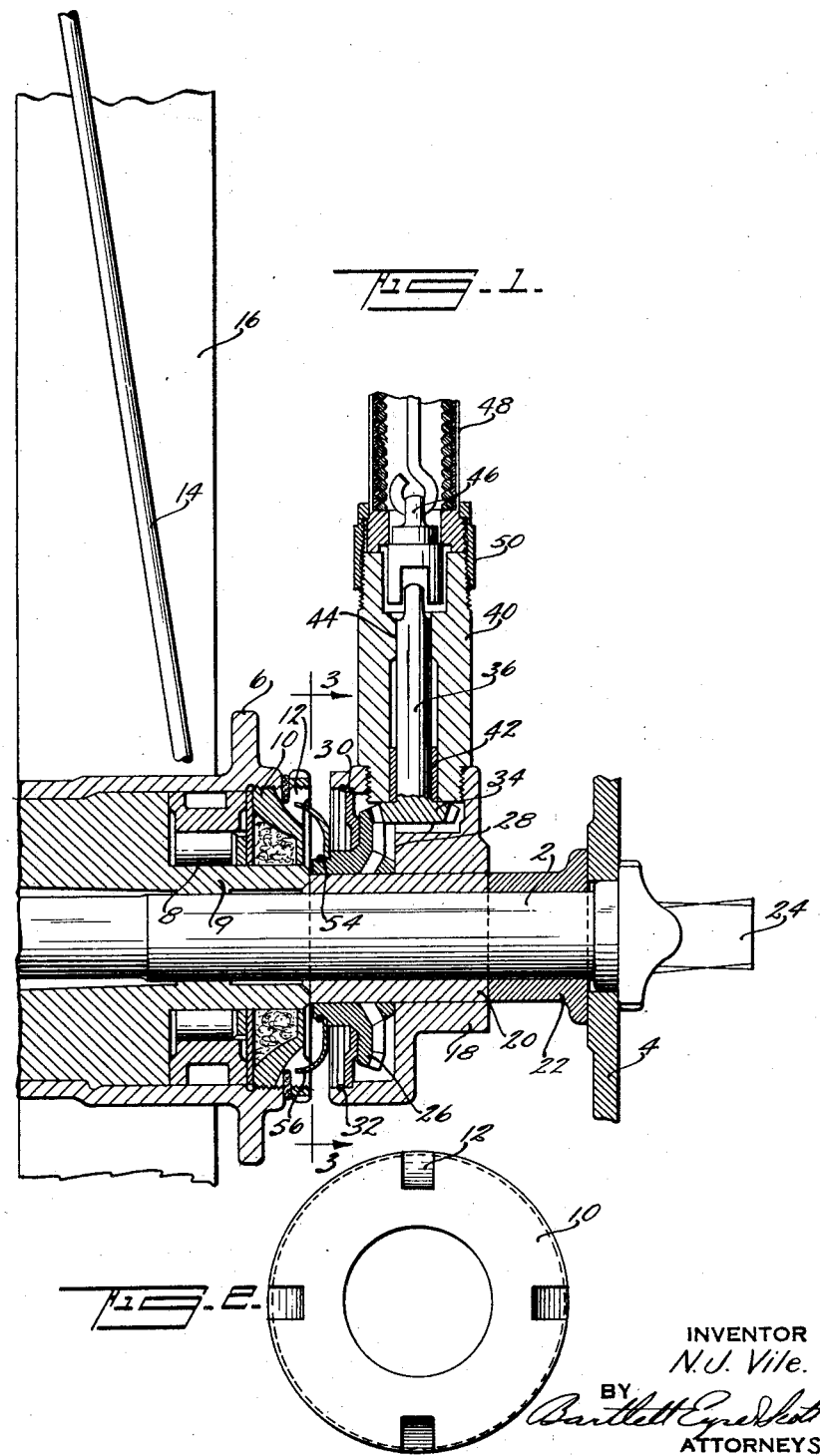

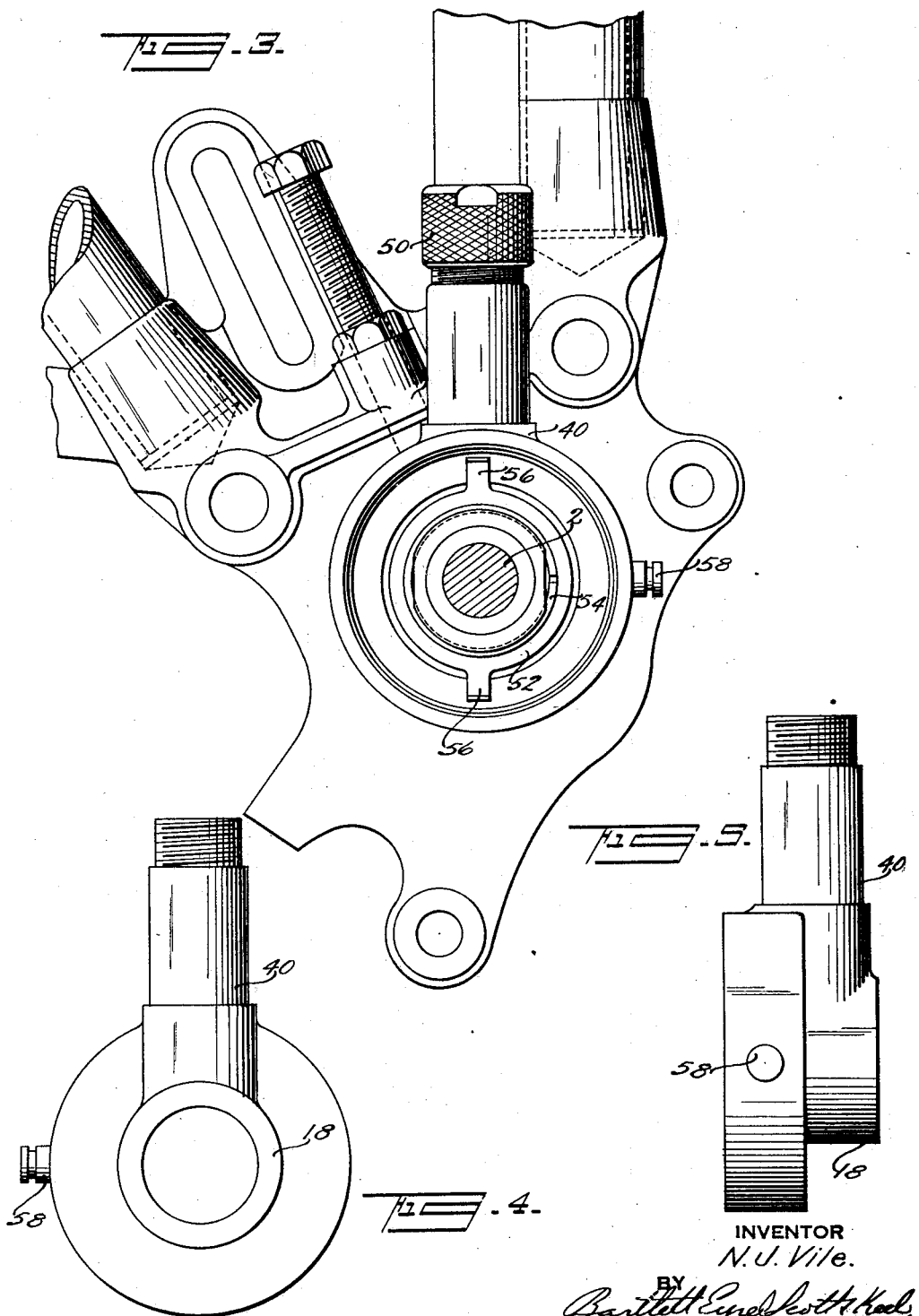

Patented Mar. 22, 1932

1,850,249

UNITED STATES PATENT OFFICE

NORMAN J. VILE, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT

DRIVING DEVICE FOR SPEED INDICATORS

Application filed August 22, 1930. Serial No. 477,003.

My invention relates to driving devices for speed indicators and other instruments, and has special reference to such devices that are particularly adapted for use in driving the speed indicator of a motorcycle.

The principal object of my invention is to provide a device of this character which is of simple, strong, durable and compact construction, in which the operative parts thereof are protected from grit and road tar, which does not mar the appearance of the vehicle, is protected against injury should the machine tip over, requires no expert adjustment, and is efficient in operation.

Another object of my invention is to provide a device of this character which is capable of accurate distance recording or speed indicating and in its attachment to the vehicle is independent of chain sprocket sizes and wheel spokes and, therefore, when geared to one size of tire may be used interchangeably on various machines with very little, if any, structural change.

The several features of my invention, whereby the above-mentioned and other objects may be attained, will be readily understood from the following description and accompanying drawings, in which:

Figure 1 is a longitudinal sectional view, partly in elevation, of one end portion of the hub of a wheel and associated parts of a motorcycle to which my improved device is applied;

Fig 2 is a detail side view of a component part of the hub of the wheel;

Fig. 3 is a sectional elevation taken on the line 3—3 of Fig. 1; and

Figs. 4 and 5 are end and side views, respectively of the casing of my improved device.

In the drawings, my improved device is shown applied to the hub of the rear wheel of a motorcycle. The wheel is provided with the usual axle 2 extending between side frames, one of which is indicated at 4, a nut for securing one end of the axle to the frame 4, a hub 6 mounted to turn on a roller bearing 8 which is interposed between the hub and the usual inner bearing member 9, a nut 10 screw-threaded into the end of the hub to retain the roller bearing in place having recesses or sockets 12 for the reception of a spanner wrench, spokes 14 and a rim 16.

My improved driving device is provided with an annular casing 18 which surrounds a hollow shaft or sleeve 20 that fits over the axle 2. The sleeve 20 is held in position by being clamped between the bearing member 9 and a collar 22 on the axle. Located within the casing 18 and mounted to turn on the sleeve 20 is a bevel gear 26 which is held from axial movement by the engagement of its inner side with a shoulder 28 on the inside of the casing and a circular plate 30 which forms a thrust bearing, the plate 30 being held in place by means of a snap ring 32. The bevel gear 26 operatively engages a pinion 34 which is formed on the end of a shaft 36. This pinion shaft is enclosed by a sleeve 40 which has its lower end screw-threaded into an aperture in the casing 18 and is provided with an internal bearing sleeve 42 and reduced bearing portion 44 for the pinion shaft. The upper end of the pinion shaft 36 is slabbed off so as to be in driving engagement with one end of a flexible shaft or cable 46, the other end of which may be connected with a speed indicator. The cable is enclosed by a suitable flexible tube 48 that is secured to the upper end of the sleeve 40 by means of a coupling member 50.

As shown, the bevel gear 26 is driven through connection with the hub 6 of the wheel. This connection comprises a clutch member 52 made in the form of a flat spring that surrounds the outer end portion of the hub of the gear 26 and is secured to the gear by a snap ring 54, the clutch member being interposed between the snap ring and a shoulder formed on the gear. This clutch member 52 is provided with opposed radial projections 56, the ends of which are bent outwardly so that when the device is in place, the projections 56 may enter two of the depressions or sockets 12 in the nut 10 and thus the gear 26 is clutched to the hub and through the pinion 34 drives the flexible shaft or cable 46. Grease may be applied to the gears within the casing through a suitable fitting 58.

With this construction it will be apparent that the device in its accuracy of distance recording or speed indicating and in its attachment to the vehicle is independent of chain sprocket size and wheel spokes, and that when geared for one size of tire may be used interchangeably on various machines with but little, if any, structural change. The enclosing casing protects the operative parts of the device from dirt and road tar, and the device is not liable to become injured in case the machine should tip over. The device may be easily and quickly applied, requires no expert adjustment, and does not mar the appearance of the vehicle.

As will be evident to those skilled in the art, my invention permits various modifications without departing from the spirit thereof or the scope of the appended claims.

What I claim is:

1. In a motor vehicle having an axle and the hub of a wheel mounted on the axle, the combination of a gear mounted on the axle independently of the hub and adjacent one end of said hub, driving connection between said end of the hub and said gear, a pinion operatively engaged by said gear, and means connected with the pinion for driving a speed indicating or distance recording device.

2. In a motor vehicle having an axle and the hub of a wheel mounted on the axle, the combination of a gear mounted on the axle adjacent one end of said hub, a coupling member comprising a flat spring surrounding said hub and secured to said gear and having projections extending into depressions in the end of said hub for establishing driving connection between said hub and said gear, a pinion operatively engaged by said gear, and a flexible shaft connected with said pinion.

3. In a motor vehicle having an axle and the hub of a wheel mounted on the axle, the combination of a casing surrounding the axle adjacent one end of said hub, a gear mounted within the casing arranged adjacent said end of the hub, driving connection between said end of the hub and said gear, a pinion mounted within the casing and operatively engaged by said gear, a pinion shaft mounted within the casing, and a flexible connection with said pinion shaft, said casing, gear, pinion and pinion shaft being removable as a unit from the hub and axle.

4. In a motor vehicle having an axle and the hub of a wheel mounted on the axle, the combination of a sleeve surrounding the axle outside of one end of said hub, a gear mounted to turn on said sleeve and arranged adjacent said end of the hub, driving connection between said end of the hub and the gear, a pinion operatively engaged by said gear, a flexible shaft connected with said pinion, and a housing enclosing said gear and pinion and mounted on said sleeve.

5. In a driving device for a speed indicator, the combination of a casing having a central aperture to permit it to be mounted on the axle of a vehicle adjacent one end of the hub of a wheel mounted on the axle, a gear mounted to turn within the casing, means carried by the gear for connecting the gear with said end of the hub when the unit is mounted on the axle, a pinion mounted within the casing and operatively engaged by said gear, a pinion shaft mounted within the casing, and a flexible shaft connected with said pinion shaft.

6. In a motor vehicle having an axle and the hub of a wheel mounted on the axle, the combination of a casing, a gear mounted within the casing, driving connection between the hub of the wheel and said gear, a pinion operatively engaged by said gear and mounted within the casing, and means connected with the pinion for driving a speed indicating or distance recording device, said casing, gear and pinion being removable as a unit from the vehicle.

In testimony whereof, I have signed my name to this specification.

NORMAN J. VILE.